United States Patent [19]
Yost et al.

[11] Patent Number: 5,886,776
[45] Date of Patent: *Mar. 23, 1999

[54] LASER BEAM RECEIVER CIRCUIT

[75] Inventors: Jerald W. Yost, Tipp City; Evelyn K. Beachy, Dayton; Timothy D. Kaiser, Beavercreek, all of Ohio

[73] Assignee: Spectra Precision, Inc., Dayton, Ohio

[*] Notice: This patent issued on a continued prosecution application filed under 37 CFR 1.53(d), and is subject to the twenty year patent term provisions of 35 U.S.C. 154(a)(2).

[21] Appl. No.: 797,844

[22] Filed: Feb. 10, 1997

[51] Int. Cl.$^6$ ............................... G01C 3/08; G01C 1/00
[52] U.S. Cl. ...................................... 356/4.08; 356/141.3
[58] Field of Search ................................ 356/4.08, 141.3

[56] References Cited

U.S. PATENT DOCUMENTS

| | | |
|---|---|---|
| 3,588,249 | 6/1971 | Studebaker . |
| 4,218,623 | 8/1980 | Utagawa ................................. 250/578 |
| 4,240,208 | 12/1980 | Pehrson . |
| 4,313,109 | 1/1982 | Funk et al. . |
| 4,488,050 | 12/1984 | Iwafune .............................. 356/141.03 |
| 4,674,855 | 6/1987 | Utagawa .................................. 354/403 |
| 4,676,634 | 6/1987 | Petersen . |
| 4,693,598 | 9/1987 | Sehr ........................................ 356/4 |
| 4,710,641 | 12/1987 | Aulds et al. ............................ 250/554 |
| 4,730,920 | 3/1988 | Schlemmer ............................. 356/4.08 |
| 4,907,874 | 3/1990 | Ake . |
| 5,033,847 | 7/1991 | Hamblin et al. . |
| 5,189,484 | 2/1993 | Koschmann et al. .................... 356/138 |

*Primary Examiner*—Stephen C. Buczinski
*Attorney, Agent, or Firm*—Killworth, Gottman, Hagan & Schaeff, LLP

[57] ABSTRACT

A laser beam receiver is provided wherein the position of a laser beam incident upon an array of a plurality of photosensitive cells is calculated by coupling the plurality of photosensitive cells to a plurality of signal amplifiers, wherein each subset of adjacent photosensitive cells is coupled to a distinct subset of amplifiers among the plurality of signal amplifiers and wherein each non-adjacent mutually-coupled cell subset is connected to a single one of the plurality of signal amplifiers; and calculating the position of the laser beam based upon amplified signals read at the plurality of signal amplifiers.

27 Claims, 5 Drawing Sheets

LASER BEAM RECEIVER CIRCUIT

Reference is made to a Microfiche Appendix hereto, having a total of one microfiche and a total of eighteen frames. The Microfiche Appendix is subdivided into Appendix A and Appendix B.

BACKGROUND OF THE INVENTION

The present invention relates to a photosensitive laser beam receiver circuit. Specifically, the present invention relates to a laser beam receiver circuit operative to enable the calculation of a position of a laser beam relative to an array of photosensitive cells.

Rotating laser beams are commonly used in the fields of civil engineering, construction, agriculture, and surveying to establish a reference plane of light. U.S. Pat. No. 5,033,847, issued Jul. 23, 1991, illustrates a laser transmitter which provides such a rotating reference beam. As is further illustrated in U.S. Pat. No. 3,588,249, issued Jun. 28, 1971, a photosensitive laser beam receiver is frequently used to monitor the position of the reference plane of light.

A conventional photosensitive laser beam receiver circuit described in U.S. Pat. No. 4,693,598, issued Sep. 15, 1987, employs a plurality of photodiodes disposed in a row and individually connected to a corresponding light emitting diode through separate amplifier circuits. When the laser beam impinges on one of the photodiodes, the corresponding light emitting diode is illuminated. An operator may then determine the relative position of the measuring receiver with respect to the radiation plane from the position of the respective light emitting diode along the light emitting diode display.

The conventional laser beam receiver circuit has a number of shortcomings, however, which limit its utility in many practical applications. Specifically, the degree of precision required in some linear position measurement applications has exceeded the degree of precision available in conventional receiver circuits. In addition, many surveying and engineering applications require laser beam receivers of significant vertical dimension, e.g., approximately 10 inches (25.4 cm) from a lowermost photosensor to an uppermost photosensor. These significant dimensions require a corresponding significant number of photosensors and, if the conventional receiver circuit is to be employed, a corresponding significant number of amplifiers. Manufacturing costs and circuit power requirements increase prohibitively with increasing numbers of amplifiers and associated circuitry.

Accordingly, there is a need for a laser beam receiver circuit of improved precision wherein a significant number of photosensors may be coupled to a reduced number of signal amplifiers and associated circuitry such that manufacturing costs and circuit power requirements are maintained at a practical level.

SUMMARY OF THE INVENTION

This need is met by the present invention wherein a laser beam receiver of improved precision is provided. The laser beam receiver includes photosensitive cells connected to photosensitive cell signal amplifiers wherein the connectivity between the cells and the amplifiers is such that merely a small number of signal amplifiers are required to amplify and distinguish signals produced at respective photosensitive cells.

In accordance with one embodiment of the present invention, a laser beam receiver is provided comprising: a plurality of photosensitive cells arranged in a first cell array and including a plurality of subsets of adjacent photosensitive cells, a plurality of subsets of non-adjacent mutually-coupled photosensitive cells; a plurality of signal amplifiers; a connection network operative to couple the plurality of photosensitive cells to the plurality of signal amplifiers, wherein the connection network is arranged such that (i) each adjacent cell subset is coupled to a distinct subset of signal amplifiers and (ii) each non-adjacent mutually-coupled cell subset is connected to a single one of the plurality of signal amplifiers; and a laser beam position calculator coupled to the plurality of signal amplifiers and operative to calculate a position of a laser beam incident upon the first cell array.

Each of the non-adjacent mutually-coupled cells are preferably separated by a plurality of intermediate cells positioned in the first cell array. The plurality of photosensitive cells outnumber the plurality of signal amplifiers and a plurality of intermediate photosensitive cells are preferably positioned between respective non-adjacent photosensitive cells.

The first cell array comprises a column of n cells, the plurality of signal amplifiers comprise a set of m amplifiers, and the column of n cells preferably includes a plurality of groups of m cells, and the connection network is operative to couple each of the groups of m cells to distinct ones of the m amplifiers. The quantity n may be a multiple of m.

At least one additional cell array may be provided wherein individual cells of the additional cell arrays are coupled to corresponding individual cells of the first cell array.

Each of the plurality of subsets of adjacent photosensitive cells are preferably spaced relative to one another so as to simultaneously intercept a single laser beam. A center-to-center spacing of adjacent photosensitive cells is approximately 0.25 inches (6.35 mm).

A number of photosensitive cells within each subset of adjacent photosensitive cells is preferably equal to a number of signal amplifiers within each distinct subset of signal amplifiers. For example, the number of photosensitive cells within each subset of adjacent photosensitive cells may comprise eight photosensitive cells and the number of signal amplifiers within each distinct subset of signal amplifiers may comprise eight signal amplifiers.

The plurality of signal amplifiers are preferably coupled to a single A/D converter. The laser beam position calculator is preferably operative to calculate a laser beam position based upon signal levels read at each of the plurality of signal amplifiers. The signal levels may form a laser beam position code, the signal levels read at each of the plurality of amplifiers may form discrete units of the position code, and the laser beam position calculator may be operative to calculate a laser beam position based upon the laser beam position code.

Each of the plurality of signal amplifiers is preferably coupled to at least one cell output line and the laser beam position calculator may be further operative to: identify cell output lines having a non-zero signal level and corresponding photosensitive cells coupled thereto; and identify a group of consecutively numbered photosensitive cells from the corresponding photosensitive cells. The laser beam position calculator may be further operative to calculate the laser beam position according to the following equation:

$$Y = \Sigma(S_i)(i)(x)/\Sigma(S_i) \qquad \text{equation (1)}$$

where Y is the laser beam position $S_i$ is the signal level at each of the consecutively numbered cells, i is a cell array row number corresponding to each of the consecutively numbered cells, and x is the center-to-center spacing of adjacent consecutively numbered photosensitive cells.

The laser beam position calculator may be operative to read signal levels at each of the plurality of signal amplifiers and rank the signal levels read at each of the plurality of signal amplifiers according to signal level magnitude so as to generate a corresponding ranking of output lines comprising a first-ranked output line and lower-ranked output lines. Further, the laser beam position calculator may be operative to rank only signal levels above a predetermined signal threshold.

The laser beam position calculator may be further operative to identify a subset of potential base point photosensitive cells, the subset of potential base point cells consisting of all photosensitive cells coupled to the first-ranked output line. Additionally, the laser beam position calculator may be operative to identify a confirmed base point photosensitive cell from the subset of potential base point photosensitive cells by selecting the potential base point cell having peripheral photosensitive cells coupled to the lower-ranked output lines. The laser beam position calculator may be further operative to calculate a laser beam position as a function of a confirmed base point cell signal magnitude, peripheral cell signal magnitudes, a confirmed base point cell center position, and peripheral cell center positions.

The laser beam position calculator may be operative to calculate the laser beam position according to:

$$Y = PYSum/PSum \qquad \text{equation (2)}$$

where Y is the centroid of a laser beam, PYSum is the summation of the confirmed base point and peripheral cell signal magnitudes multiplied by corresponding cell center positions, and PSum is the summation of the confirmed base point and peripheral cell signal magnitudes.

In accordance with another embodiment of the present invention, a method of calculating a position of a laser beam incident upon an array of a plurality of photosensitive cells including a plurality of subsets of adjacent photosensitive cells and a plurality of subsets of non-adjacent mutually-coupled photosensitive cells comprising the steps of: coupling the plurality of photosensitive cells to a plurality of signal amplifiers, wherein each subset of adjacent photosensitive cells is coupled to a distinct subset of amplifiers among the plurality of signal amplifiers and wherein each non-adjacent mutuallycoupled cell subset is connected to a single one of the plurality of signal amplifiers; and calculating the position of the laser beam based upon amplified signals read at the plurality of signal amplifiers.

The step of calculating the position of the laser beam may comprise: identifying cell output lines having a non-zero amplified signal level and corresponding photosensitive cells connected thereto, wherein each of the plurality of signal amplifiers is coupled to at least one cell output line; and identifying a group of consecutively numbered photosensitive cells from the corresponding photosensitive cells. Additionally, the step of calculating the position of the laser beam may further comprise calculating the laser beam position from $$Y = \Sigma(S_i)(i)(x)/\Sigma(S_i) \qquad \text{equation (1)}$$

where Y is the laser beam position $S_i$ is the signal level at each of the consecutively numbered cells, i is a cell array row number corresponding to each of the consecutively numbered cells, and x is the center-to-center spacing of adjacent consecutively numbered photosensitive cells.

The step of calculating the position of the laser beam may comprise establishing and decoding a laser beam position code based upon the amplified signals, wherein the signal levels read at each of the plurality of amplifiers form discrete units of the position code.

Alternatively, the step of calculating the position of the laser beam comprises ranking the signal levels read at each of the plurality of signal amplifiers according to signal level magnitude so as to generate a corresponding ranking of output lines comprising a first-ranked output line and lower-ranked output lines. Additionally, the step of calculating the position of the laser beam may comprise ranking only the signal levels above a predetermined signal threshold and the step of calculating the position of the laser beam may further comprise identifying a subset of potential base point photosensitive cells, the subset of potential base point cells consisting of the photosensitive cells coupled to the first-ranked output line. The step of calculating the position of the laser beam may further comprise identifying a confirmed base point photosensitive cell from the subset of potential base point photosensitive cells by selecting the potential base point cell having peripheral photosensitive cells coupled to the lower-ranked output lines. The laser beam position may then be calculated as a function of a confirmed base point cell signal magnitude, peripheral cell signal magnitudes, a confirmed base point cell center position, and peripheral cell center positions. As a result, the laser beam position may be calculated according to the following equation:

$$Y = PYSum/PSum \text{ equation} \qquad (2)$$

where Y is the centroid of a laser beam, PYSum is the summation of the confirmed base point and peripheral cell signal magnitudes multiplied by corresponding cell center positions, and PSum is the summation of the confirmed base point and peripheral cell signal magnitudes.

In accordance with yet another embodiment of the present invention, a laser beam receiver is provided comprising: a plurality of photosensitive cells arranged in a first cell array, the first cell array including a plurality of subsets of adjacent photosensitive cells; a plurality of signal amplifiers; a connection network operative to couple the plurality of photosensitive cells to the plurality of signal amplifiers, wherein the connection network is arranged such that each subset of adjacent photosensitive cells is coupled to a distinct subset of signal amplifiers among the plurality of signal amplifiers and such that at least two of the plurality of photosensitive cells are connected to a single one of the plurality of signal amplifiers; and a laser beam position calculator coupled to the plurality of signal amplifiers and operative to calculate a position of a laser beam incident upon the first cell array. Preferably, at least three of the plurality of photosensitive cells are connected to a single one of the plurality of signal amplifiers.

Accordingly, it is an object of the present invention to provide a laser receiver which is operative to provide a calculation of a laser beam position by coupling a significant number of photosensors to a reduced number of signal amplifiers and associated circuitry to reduce manufacturing costs and circuit power requirements.

DETAILED DESCRIPTION OF THE INVENTION

Figure 1:
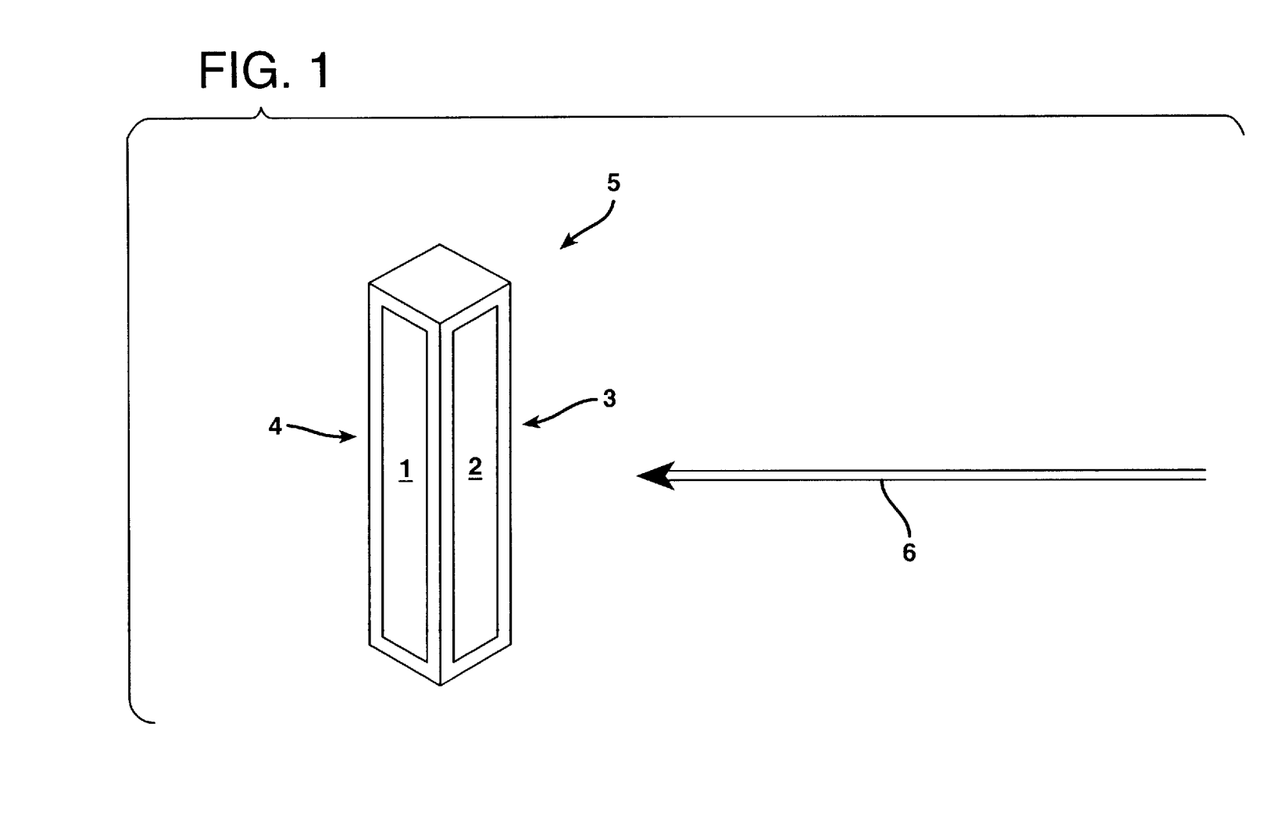
FIG. 1 is an illustration of a laser beam receiver according to the present invention.
Figure 2:
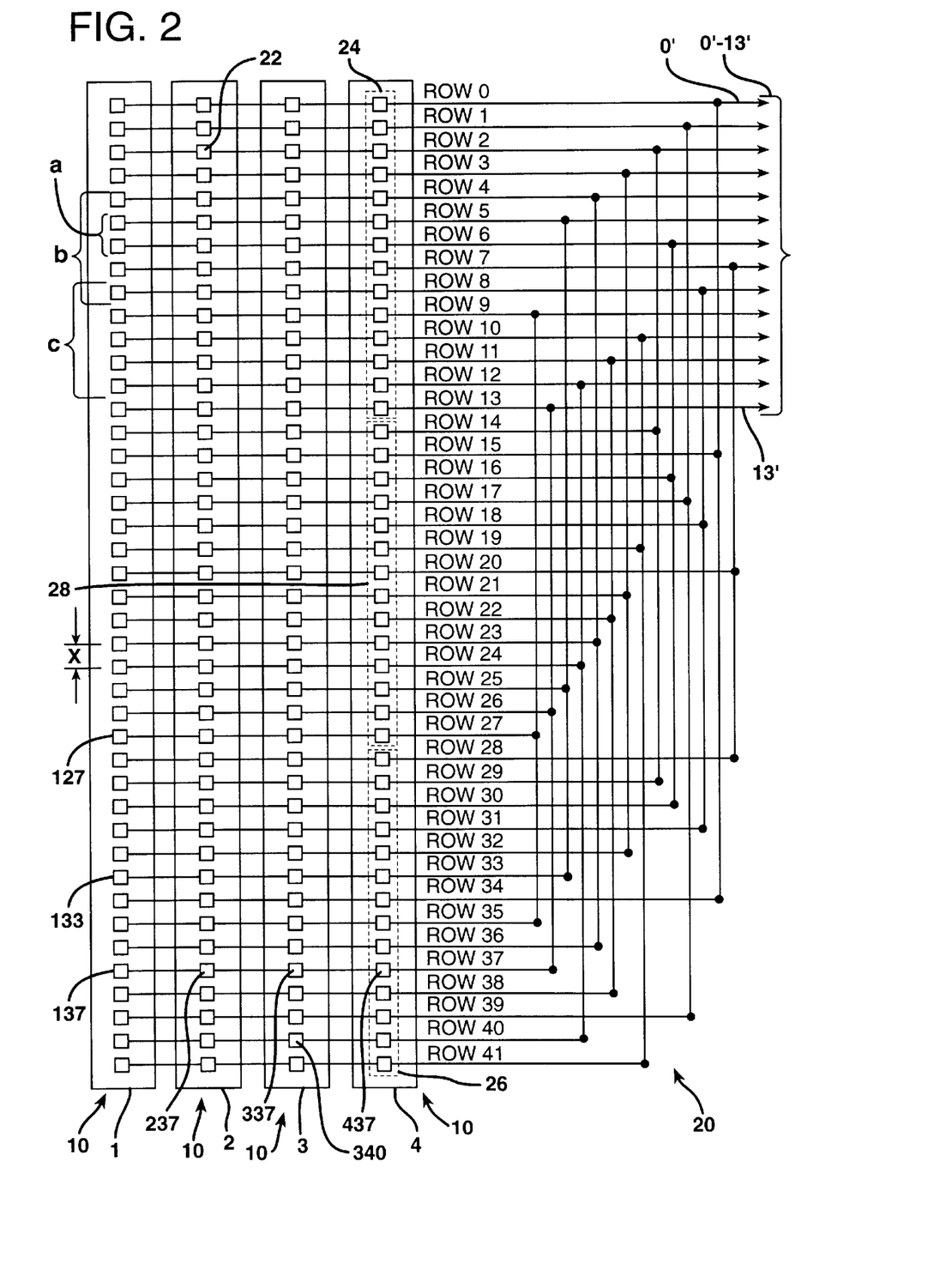
FIG. 2 is a schematic illustration of the connectivity of a plurality of photosensitive cells according to the present invention.
Figure 3:
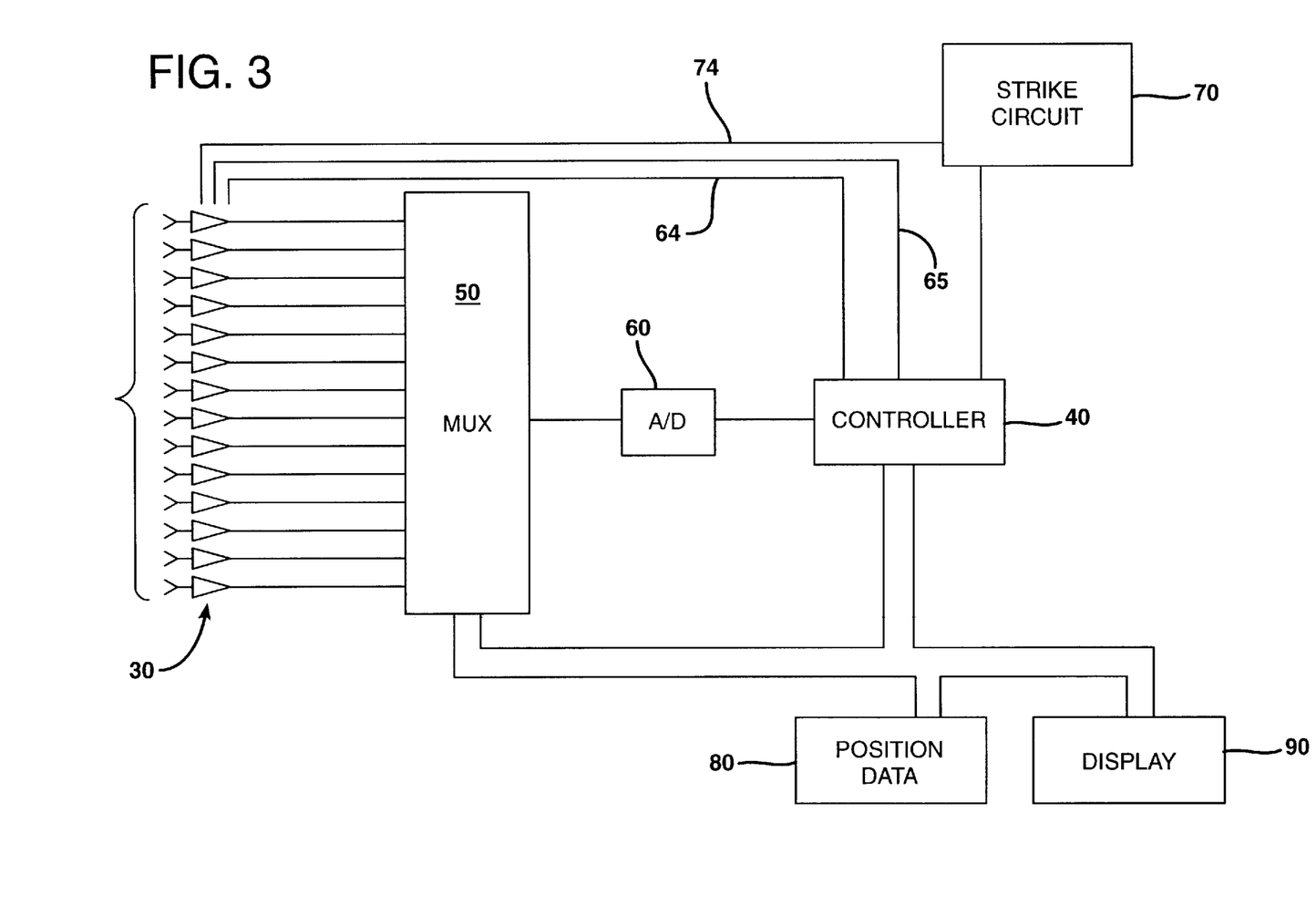
FIG. 3 is a schematic block diagram of a laser receiver circuit to be coupled to the plurality of photosensitive cells illustrated in FIG. 1, according to the present invention.
Figures 4, 4A:
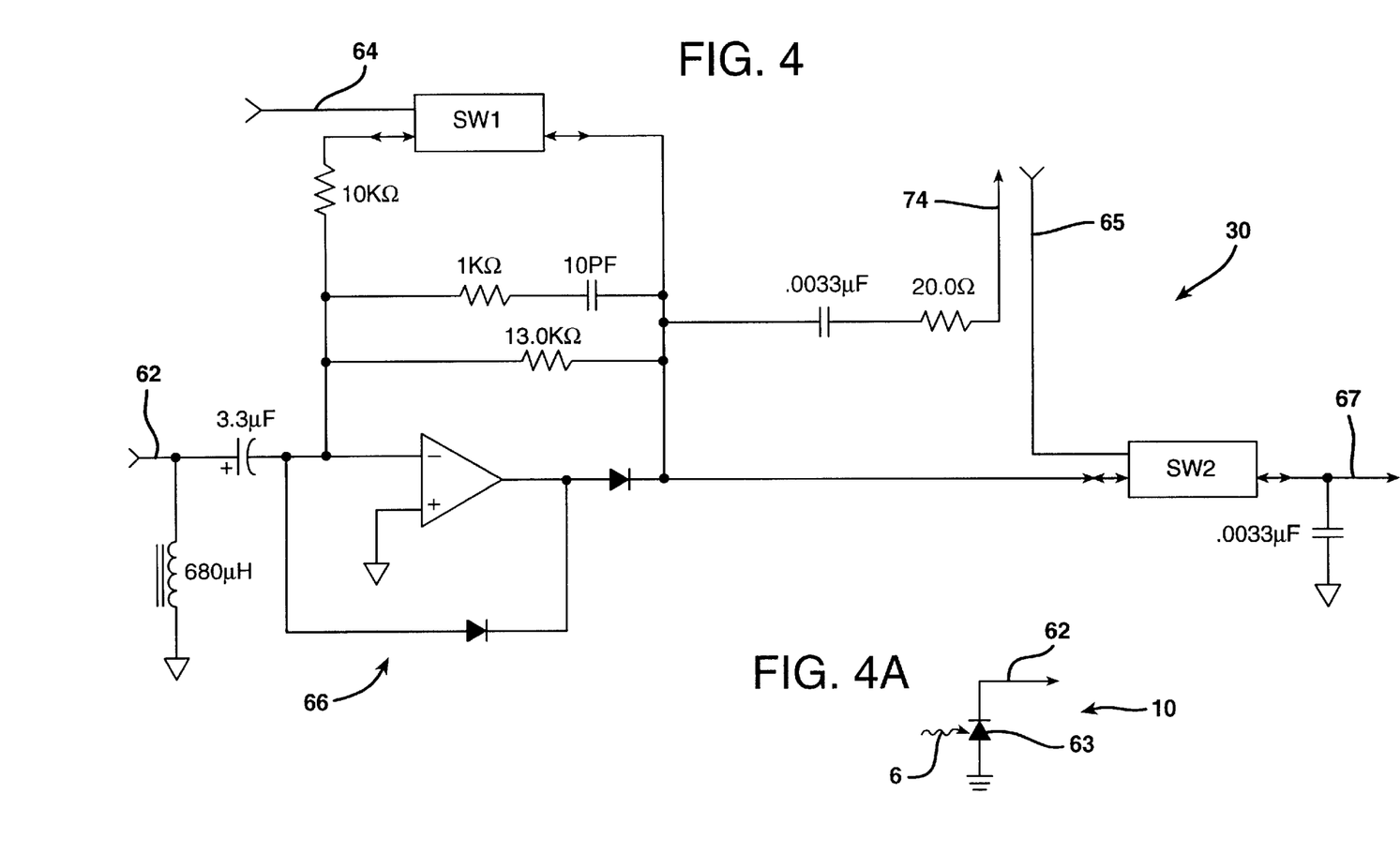
FIG. 4 is schematic circuit diagram of a signal amplifier circuit according to the present invention.
FIG. 4A is an illustration of a photosensitive cell arrangement according to the present invention.
Figure 5:
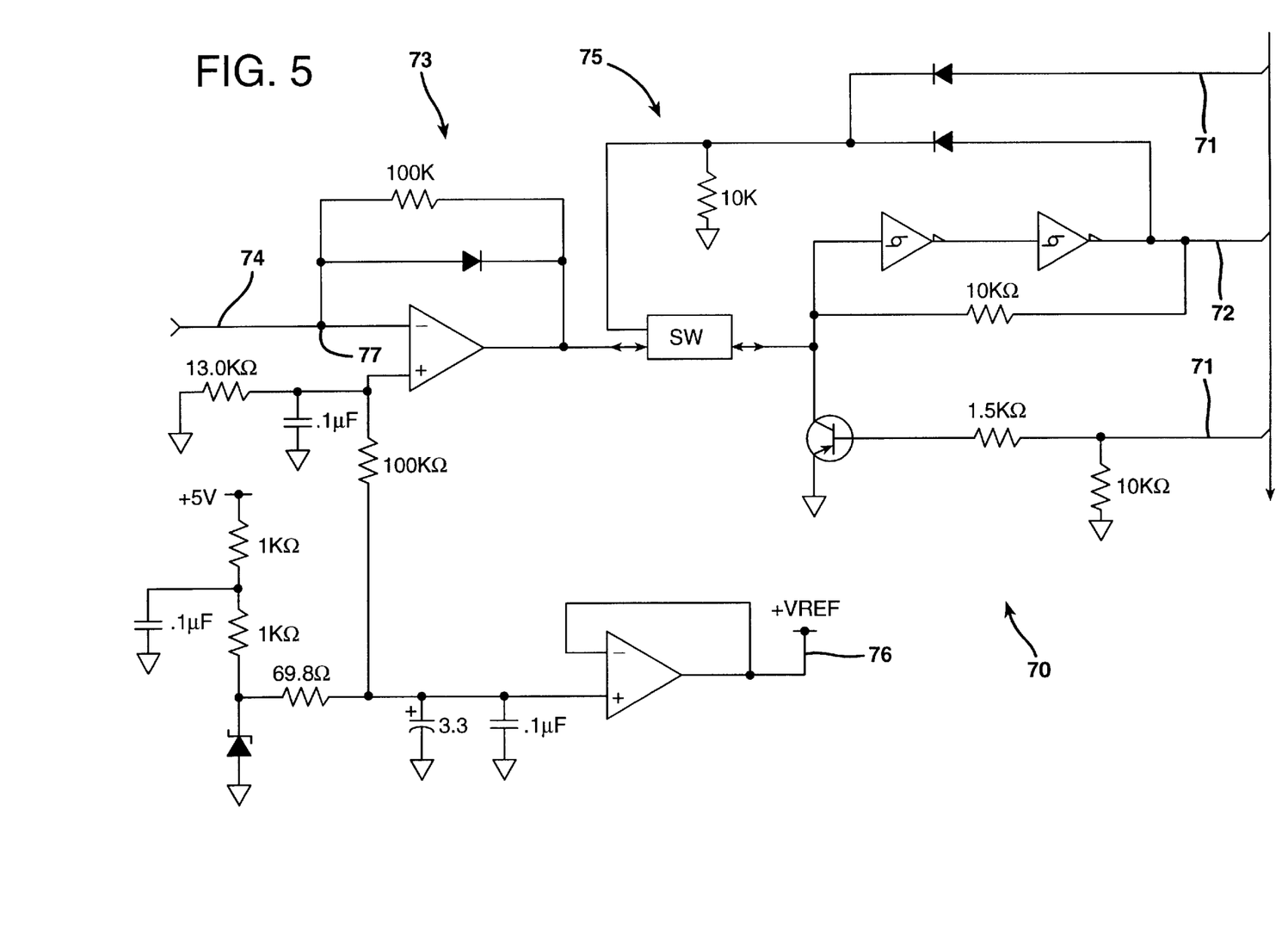
FIG. 5 is a schematic circuit diagram of laser strike circuit according to the present invention.

An example of a laser beam receiver 5 according to the present invention is illustrated in FIGS. 1–3. Schematic circuit diagrams of-specific components of the laser beam receiver 5 are illustrated in FIGS. 4 and 5. The laser beam receiver 5 includes a plurality of photosensitive cells 10 arranged in four vertically oriented cell arrays 1–4 defining a plurality of rows of photosensitive cells 10, as indicated by the rows numbered 0–41' in FIG. 2. As indicated in FIG. 1, the cell arrays 1–4 are positioned so as to enable interception of a laser beam 6, having a characteristic laser beam cross section, incident from any direction. For the convenience of illustration, the cells 10 may be numbered according to their respective array and row number, where the first digit of the cell number corresponds to the array number and the second digit(s) of the cell number correspond to the row number, e.g., cell numbers 22, 127, 133, 237, 340, and 437 are labeled in FIG. 2. Corresponding cells 10 within each cell array 1–4 are connected in parallel to one of the cell output lines 0'–13' via a connection network 20, as illustrated in FIG. 2. See, for example, cell numbers 137, 237, 337 and 437.

The photosensitive cells 10 within each array 1–4 are arranged adjacent to one another such that a plurality of subsets of adjacent photosensitive cells can be identified within each cell array 1–4. As is clearly illustrated in FIG. 2, the photosensitive cells 10 within each cell array 1–4 are individually spaced in succession along a single linear path. Stated differently, the photosensitive cells 10 within each cell array 14 comprise a single row of photosensitive cells individually spaced in succession in a single line. Individual cells 10 may belong to more than one different adjacent cell subset. For example, as is illustrated in FIG. 2, cells 15 and 16 form a subset a of adjacent cells, cells 14–18 form a subset b of adjacent cells, and cells 18, 19, and 110–112 form a subset c of adjacent cells. As is clearly illustrated in FIG. 2, referring solely to the cell array 4 for clarity of illustration, each cell array 1–4 is defined by a plurality of photosensitive cell sub-arrays 24, 26, 28 wherein each cell sub array 24, 26, 28 is coupled to a common set of signal amplifiers 30 via the cell output lines 0'–13'. The connection network 20 is arranged such that each photosensitive cell within each cell sub-array 24, 26, 28 is coupled to a distinct signal amplifier of said plurality of signal amplifiers 30 via a distinct cell output line 0'–13'. Each cell sub-array 24, 26, 28 includes a plurality of subsets of adjacent photosensitive cells, as described above. Further, each of the adjacent cell subsets within each cell sub-array 24, 26, 28 is coupled to a distinct subset of signal amplifiers. Stated differently, no two or more adjacent cells are coupled to the same combination of signal amplifiers.

Each photosensitive cell 10 is connected to one of the cell output lines 0'–13' via a connection network 20. A plurality of subsets of non-adjacent mutually-coupled photosensitive cells can be identified within each cell array 1–4 by referring to the connectivity of the connection network 20. Specifically, two or more cells are said to be non-adjacent mutually-coupled cells if they lie in non-adjacent rows, i.e., separated by at least one intermediate row of intermediate cells, and are each connected to the same output line 0'–13'. For example, the cells 10 of row 0, row 15, and row 34 are non-adjacent because they lie in non-adjacent rows 0, 15, and 34 and are mutually-coupled because they are each connected to the first output line 0'.

The connection network 20 is arranged such that each adjacent cell subset is coupled to a distinct signal amplifier subset among a group of signal amplifiers 30 connected to respective output lines 0'–13'. For example, cells 14–18, adjacent cell subset b, are connected to a signal amplifier subset consisting of those amplifiers 30 connected to output lines 4'–8', while cells 18, 19, and 110–112, adjacent cell subset c, are connected to a signal amplifier subset consisting of signal amplifiers 30 connected to output lines 8'–12'. The connection network 20 is further arranged such that each non-adjacent mutually-coupled cell subset is connected to a single one of the plurality of signal amplifiers 30. For example, cell numbers 10, 115, and 134 are connected to output line 0'. In the embodiment illustrated in FIGS. 1–3, the first cell array 1 comprises a column of n cells where n=42, the plurality of signal amplifiers 30 comprise a set of m amplifiers where m=14, the column of n cells includes a plurality of groups of m cells, namely three groups of 14 cells, and the connection network is operative to couple each of the m cells to distinct ones of the m amplifiers, i.e., each cell within each group of 14 cells is coupled to a distinct amplifier 30.

The photosensitive cells 10 are spaced relative to one another such that at least two cells 10 simultaneously intercept the cross section of the single laser beam 6. For example, a center-to-center spacing of adjacent photosensitive cells is approximately 0.25 inches (6.35 mm). If the spacing of the cells 10 and the size of the beam cross section is such that two cells simultaneously intercept the beam, then the subset of adjacent photosensitive cells will consist of two member cells and the distinct signal amplifier subset will consist of two amplifiers. Similarly, if eight cells simultaneously intercept the beam, then the subset of adjacent photosensitive cells will consist of eight member cells and the distinct signal amplifier subset will consist of eight amplifiers. In other words, the number of photosensitive cells 10 within each subset of adjacent photosensitive cells is equal to the number of signal amplifiers 30 within each distinct subset of signal amplifiers.

A programmable controller 40, preferably a digital microprocessing unit, operating as a laser beam position calculator, is coupled to the signal amplifiers 30 via a multiplexer 50 and a single analog-to-digital converter 60 and is programmed to calculate the vertical position of a laser beam 6 incident upon one or more of the cell arrays 1–4 as a function of signal levels read at each of the signal amplifiers 30. The multiplexer 50 couples the signal amplifiers 30 to the single A/D converter 60 to enable digital data processing at the controller 40. Examples of appropriate source code for achieving the position calculation function are included in the Microfiche Appendix attached hereto. Specifically, two position calculation algorithms are presented in the Microfiche Appendix and described in detail herein.

The respective arrangements of each photosensitive cell 10 and each signal amplifier 30 is illustrated in detail with reference to FIGS. 4 and 4A. According to the embodiment illustrated in FIG. 4 and 4A, each photosensitive cell 10 is a PIN diode 63 and each PIN diode 63 is connected between ground and the signal amplifier 30 at a signal amplifier input 62. A signal amplification section 66 of the signal amplifier 30 is a dual gain trans-impedance amplifier provided with current feedback. The controller 40, via a gain control signal 64, is programmed to open or close analog switch SW 1 to enable selection of a high gain for relatively low beam intensities and a low gain for relatively high beam intensities so as to establish appropriate laser receiver 5 sensitivity and accuracy, depending upon the requirements of a particular application. In this manner, the signal amplifier 30 produces an amplified signal 67 which is proportional to the peak intensity of the signal produced by the photosensitive cell 10. The controller 40, via a sample signal 65 operative to open or close analog switch SW2, is programmed to send the amplified signal 67 to the multiplexer 50.

A laser strike circuit 70, illustrated in detail in FIG. 5, is in communication with the controller 40 and is operative to provide a laser strike output 72 to the controller 40 when a laser beam has been intercepted by one of the arrays 1–4. The laser strike output 72 is produced in response to a laser strike signal 74 produced at the signal amplifier 30, see FIG. 4. The laser strike output 72, via the programmed operation of the controller 40, initiates generation of the sample signal 65 and initiates the program sequence responsible for the above described calculation of the laser beam position.

The laser strike circuit 70 illustrated in FIG. 4 includes a operational amplifier differentiator portion 73 and comparator and latch portion 75. The laser strike signal 74 produced at the signal amplifier 30 is input to a summing junction 77 of the differentiator portion 73. The controller 40 generates latch reset signals 71 necessary for proper operation of the comparator and latch portion 75. In operation, the laser strike circuit 70 senses a drop in the magnitude of the laser strike signal 74 corresponding to an increase and subsequent decrease in the intensity of the signal produced by the photosensitive cell 10. As will be appreciated by those skilled in the art, the magnitude of reference voltage 76 established in the differentiator portion 73 is set according to the probable intensity of the laser beam, system sensitivity requirements, and error ranges of the particular laser receiver 5.

It is contemplated by the present invention that any one of a variety of conventional circuitry arrangements and respective components may be utilized to perform the herein described functions of the photosensitive cells 10, the signal amplifiers 30, and the laser strike circuit 70. Further, it is contemplated by the present invention that the specific components of the present invention, as illustrated in FIGS. 2 and 3, can be replaced by other components capable of performing the operations of the present invention.

According to one embodiment of the present invention, the controller 40 is operative to read signal levels at each of the signal amplifiers 30 and to calculate the vertical position of a laser beam 6 incident upon one or more of the cell arrays 1–4 by identifying each signal amplifier 30 at which a non-zero signal is read and further identifying consecutively numbered photosensitive cells 10 coupled thereto. The computer source code in Appendix A of the Microfiche Appendix represents the operational sequence of this embodiment of the present invention.

First, the signal levels read at each of the output lines 0'–13' are stored. The following table illustrates an example of stored signal levels where the cross section of the laser beam 6 is large enough to be intercepted by four cells 10 of a single array:

TABLE 1

| Output Line | Signal Level (mV) |
| --- | --- |
| 0' | 0 |
| 1' | 0 |
| 2' | 0 |
| 3' | 167 |
| 4' | 0 |
| 5' | 0 |
| 6' | 0 |
| 7' | 1283 |
| 8' | 36 |
| 9' | 0 |
| 10' | 735 |
| 11' | 0 |
| 12' | 0 |
| 13' | 0 |

Next, the output lines or channels 0'–13' having a non-zero signal level, and the corresponding cells connected thereto, are identified, see Table 2. Preferably, only signal levels above a predetermined signal threshold are identified as having a non-zero signal level. In order to determine the position of the laser beam 6, it is not necessary to determine which cell array intercepts the laser beam 6. Accordingly, it is not necessary to distinguish signals originating from photosensitive cells 10 of the same row and reference need only be made to the respective rows of cells. For example, with reference to Table 2, all cells 10 coupled to output line 3' will be potential base point cells, i.e., the cells in rows 3, 21, and 32.

TABLE 2

| Output Line | 3' | 7' | 8' | 10' |
| --- | --- | --- | --- | --- |
| Cell Row No. | 3, 21, 32 | 7, 20, 28 | 8, 18, 31 | 10, 19, 41 |

The cells so identified are then arranged in ascending order: 3, 7, 8, 10, 18, 19, 20, 21, 28, 31, 32, 41. A group of four cell rows in consecutive order are then identified. The position of these four cells is indicative of the position of the laser beam because there are only four valid output lines. With reference to the example, by examination, these are rows 18, 19, 20, 21.

To calculate the position of the centroid of the laser beam 6 from the consecutively numbered row numbers, with the cell 0' at position 0, we use the following equation:

$$Y = \Sigma(S_i)(i)(x)/\Sigma(S_i) \qquad \text{equation (1)}$$

where Y is the centroid of the laser beam 6 and $S_i$ is the signal level at the photocell in row i, i corresponds to the row numbers of the consecutively numbered rows, and x is the center-to-center spacing of adjacent photosensitive cells 10, e.g., 6.35 mm. For the data illustrated in Table 2:

$$\begin{aligned} Y &= 6.35 \times [(36 \times 18) + (735 \times 19) + (1283 \times 20) + \\ &\quad (167 \times 21)]/[36 + 735 + 1283 + 167] \\ &= 125.17. \end{aligned}$$

Accordingly, the centroid of the laser beam 6 falls at a position 125.17 mm from a reference point defined by the center of the cells 10 in row 0'.

The laser beam position, calculated as described above, is made available for direct output at a position data port 80 and is also sent to a display 90. The position data port 80 can be any appropriate data output port, e.g. a serial or parallel data port, a fiber optic data port, etc. The display 90 can be any of a variety of visual display types, e.g., an LED display, a visual numerical display, and any of a variety of other display types, e.g. an audio display.

According to the connection network 20 illustrated in FIG. 2, the possibility of a false position calculation does not arise unless the beam cross section is not large enough to be intercepted by at least two photosensitive cells 10. Further, according to the connection network 20 illustrated in FIG. 2, if the beam cross section becomes large enough to be intercepted simultaneously by eight or more cells 10, the probability of a false position calculation increases. The connection network 20 illustrated in FIG. 2 is merely an example of a specific embodiment of the present invention and that a variety of expanded or narrowed connection networks with a corresponding variety of numbers of photosensitive cells and signal amplifiers can be utilized to increase the number of cells 10 which may simultaneously intercept the laser beam without increasing the probability of a false position calculation.

According to another embodiment of the present invention, the controller 40 is operative to read signal levels at each of the signal amplifiers 30 and to calculate the vertical position of a laser beam 6 incident upon one or more of the cell arrays 1–4 by identifying each signal amplifier 30 at which a non-zero signal is read and further ranking the signal levels read at each of the plurality of signal amplifiers according to their respective signal level magnitudes. The computer source code in Appendix B of the Microfiche Appendix represents the operational sequence of this embodiment of the present invention.

First, the signal levels read at each of the output lines 0'–13' are stored. The following table illustrates an example of stored signal levels where the cross section of the laser beam 6 is large enough to be intercepted by at least five cells 10 of a single array:

TABLE 3

| Output Line | Signal Level (mV) |
|---|---|
| 0' | 0.2 |
| 1' | 1.7 |
| 2' | 0.3 |
| 3' | 1.3 |
| 4' | 0.1 |
| 5' | 0.3 |
| 6' | 0.3 |
| 7' | 11.0 |
| 8' | 14.0 |
| 9' | 0.1 |
| 10' | 24.0 |
| 11' | 0.1 |
| 12' | 0.2 |
| 13' | 0.4 |

Next, the stored signal levels are ranked according to signal level magnitude so as to generate a corresponding ranking of output lines comprising a first-ranked output line and a predetermined number, e.g. four, of lower-ranked output lines:

TABLE 4

| Rank | Output Line | Cell Number |
|---|---|---|
| 1 | 10' | ? |
| 2 | 8' | ? |
| 3 | 7' | ? |
| 4 | 1' | ? |
| 5 | 3' | ? |

Preferably, only signal levels above a predetermined signal threshold are ranked. Next, a subset of potential base point photosensitive cells are identified, the subset of potential base point cells consists of all the photosensitive cells 10 coupled to the first-ranked output line. In order to determine the position of the laser beam 6, it is not necessary to determine which cell array intercepts the laser beam 6. Accordingly, it is not necessary to distinguish signals originating from photosensitive cells 10 of the same row and reference need only be made to the respective rows of cells. For example, with reference to the results of Table 4, all cells 10 coupled to output line 10' will be potential base point cells, i.e., the cells in rows 10, 19, and 41.

A confirmed base point photosensitive cell is identified from the potential base point cells by examining the signal levels of the output lines connected to those cells which are directly adjacent to each potential base point cell, i.e., the respective peripheral photosensitive cells. The potential base point cell having peripheral photosensitive cells which are connected to the lower-ranked output lines will be identified as the confirmed base point cell. For example, with reference to the results of Table 4, the confirmed base point cell is in row number 19 because the peripheral photosensitive cells in rows 17, 18, 20, and 21 are connected to the lower-ranked output lines 1', 8', 7', and 3'.

The laser beam position calculator calculates a laser beam position as a function of (i) the signal magnitude corresponding to the confirmed base point cell, (ii) the signal magnitudes corresponding to peripheral cells, (iii) the center position of the confirmed base point cell with respect to the vertical dimension of the cell array 1–4, and (iv) the center positions peripheral cells. Specifically, the laser beam position calculator is operative to calculate the laser beam position according to the following equation:

$$Y = PYSum/PSum \qquad \text{equation (2)}$$

where Y is the centroid of a laser beam, PYSum is the summation of the confirmed base point and peripheral cell signal magnitudes multiplied by corresponding cell center positions, and PSum is the summation of the confirmed base point and peripheral cell signal magnitudes.

The laser beam position, calculated as described above, is made available for direct output at a position data port 80 and is also sent to a display 90. The position data port 80 can be any appropriate data output port, e.g, a serial or parallel data port, a fiber optic data port, etc. The display 90 can be any of a variety of visual display types, e.g., an LED display, a visual numerical display, and any of a variety of other display types, e.g. an audio display.

For the embodiment illustrated in FIGS. 1–3, Table 5 is stored to facilitate ranking of the output lines, identification of the subset of potential base point cells, the confirmed base point cell, the examination of the peripheral cell signals, and the calculation of the laser beam position. According to the connection network 20 illustrated in FIG. 2, the possibility of a false position calculation does not arise unless the beam cross section is not large enough to be intercepted by at least two photosensitive cells 10. Further, according to the connection network 20 illustrated in FIG. 2, if the beam cross section becomes large enough to be intercepted simultaneously by eight or more cells 10, the probability of a false position calculation increases. The connection network 20 illustrated in FIG. 2 is merely an example of a specific embodiment of the present invention and that a variety of expanded or narrowed connection networks with a corresponding variety of numbers of photosensitive cells and signal amplifiers can be utilized to increase the number of cells 10 which may simultaneously intercept the laser beam without increasing the probability of a false position calculation.

TABLE 5

| Cell Row Number | Output Line | Cell Center Position (mm) | Cell Center Position (in.) |
|---|---|---|---|
| 0 | 0' | −130.2 | −5.125 |
| 1 | 1' | −123.8 | −4.875 |
| 2 | 2' | −117.5 | −4.625 |
| 3 | 3' | −111.1 | −4.375 |
| 4 | 4' | −104.8 | −4.125 |
| 5 | 5' | −98.4 | −3.875 |
| 6 | 6' | −92.1 | −3.625 |
| 7 | 7' | −85.7 | −3.375 |
| 8 | 8' | −79.4 | −3.125 |
| 9 | 9' | −73.0 | −2.875 |
| 10 | 10' | −66.7 | −2.625 |
| 11 | 11' | −60.3 | −2.375 |
| 12 | 12' | −54.0 | −2.125 |
| 13 | 13' | −47.6 | −1.875 |
| 14 | 2' | −41.3 | −1.625 |
| 15 | 0' | −34.9 | −1.375 |
| 16 | 6' | −28.6 | −1.125 |
| 17 | 1' | −22.2 | −0.875 |
| 18 | 8' | −15.9 | −0.625 |
| 19 | 10' | −9.5 | −0.375 |
| 20 | 7' | −3.2 | −0.125 |
| 21 | 3' | 3.2 | 0.125 |
| 22 | 11' | 9.5 | 0.375 |
| 23 | 4' | 15.9 | 0.625 |
| 24 | 12' | 22.2 | 0.875 |
| 25 | 5' | 28.6 | 1.125 |
| 26 | 13' | 34.9 | 1.375 |
| 27 | 9' | 41.3 | 1.625 |
| 28 | 7' | 47.6 | 1.875 |
| 29 | 2' | 54.0 | 2.125 |
| 30 | 6' | 60.3 | 2.375 |
| 31 | 8' | 66.7 | 2.625 |
| 32 | 3' | 73.0 | 2.875 |
| 33 | 5' | 79.4 | 3.125 |
| 34 | 0' | 85.7 | 3.375 |
| 35 | 9' | 92.1 | 3.625 |
| 36 | 4' | 98.4 | 3.875 |
| 37 | 13' | 104.8 | 4.125 |
| 38 | 11' | 111.1 | 4.375 |
| 39 | 1' | 117.5 | 4.625 |
| 40 | 12' | 123.8 | 4.875 |
| 41 | 10' | 130.2 | 5.125 |

In yet another embodiment of the present invention, the controller 40 is programmed to calculate the vertical position of the laser beam 6 merely by identifying upon which photosensitive cells 10 the laser beam 6 is incident. The signal levels read at each of the signal amplifiers 30 collectively form a laser beam position code because each adjacent cell subset is coupled to a distinct signal amplifier subset. Specifically, the signal levels read at each of the plurality of amplifiers form discrete units of the position code, and the laser beam position calculator is operative to calculate a laser beam position based upon the laser beam position code. Where the laser beam 6 is simultaneously intercepted by four photosensitive cells 10, a coded output is produced at output lines 0'–13'. The output will include four high level signal lines, corresponding to the number of cells intercepting the laser beam, and ten low level signal lines. For example, where the cells of row numbers 20–23 intercept the beam 6, the signal levels at the output lines 0'–13' will be: L-L-L-H-H-L-L-H-L-L-L-H-L-L (L and H represent low and high signals at the output lines 0'–13' respectively). The connection network 20 illustrated in FIG. 2 is arranged such that no other set of four intercepted cells will produce the same coded output at the output lines 0'–13'. According to the embodiment illustrated in FIG. 2, this level of discrimination is preserved by the connection network unless more than eight photosensitive cells 10 simultaneously intercept the beam 6. The cell numbers intercepting the beam 6 can be determined by decoding the code created at the output lines 0'–13' via an algorithm, a preprogrammed look-up table, or any other appropriate means, and displayed or made available for output as described above.

Having described the invention in detail and by reference to preferred embodiments thereof, it will be apparent that modifications and variations are possible without departing from the scope of the invention defined in the appended claims. For example, it is contemplated by the present invention that the laser receiver 5 including the plurality of photosensitive cells 10, the plurality of signal amplifiers 30, and the connection network 20 described herein may be coupled to a controller programmed to calculate the position of the laser beam 6 incident upon one or more of the cell arrays 1–4 by an operational sequence other than those described herein.

We claim:

1. A laser beam receiver comprising:
  a plurality of photosensitive cells arranged in a first cell array, wherein said first cell array includes, a plurality of pairs of adjacent photosensitive cells and a plurality of subsets of non-adjacent mutually-coupled photosensitive cells, and wherein said photosensitive cells within said first cell array comprise a single row of photosensitive cells individually spaced in succession in a single line;
  a plurality of signal amplifiers;
  a connection network operative to couple respective ones of said plurality of photosensitive cells to respective ones of said plurality of signal amplifiers, wherein said connection network is arranged such that
    (i) each adjacent cell pair is coupled to a distinct subset of signal amplifiers and
    (ii) each non-adjacent mutually-coupled cell subset is connected to a single one of said plurality of signal amplifiers; and
  a laser beam position calculator coupled to said plurality of signal amplifiers and operative to calculate a position of a laser beam incident upon said first cell array.

2. A receiver as claimed in claim 1 wherein each of said non-adjacent mutually-coupled cells are separated by a plurality of intermediate cells positioned in said first cell array.

3. A receiver as claimed in claim 1 wherein said plurality of photosensitive cells outnumber said plurality of signal amplifiers.

4. A receiver as claimed in claim 3 wherein a plurality of intermediate photosensitive cells are positioned between respective non-adjacent photosensitive cells.

5. A receiver as claimed in claim 1 wherein said first cell array comprises a column of n cells, said plurality of signal amplifiers comprise a set of m amplifiers, said column of n cells includes a plurality of groups of m cells, and said connection network is operative to couple each of said m cells to distinct ones of said m amplifiers.

6. A receiver as claimed in claim 5 wherein n is a multiple of m.

7. A receiver as claimed in claim 1 further comprising at least one additional cell array wherein individual cells of said at least one additional cell array are coupled to corresponding individual cells of said first cell array.

8. A receiver as claimed in claim 1 wherein each of said plurality of pairs of adjacent photosensitive cells are spaced relative to one another so as to simultaneously intercept a single laser beam.

9. A receiver as claimed in claim 8 wherein a center-to-center spacing of adjacent photosensitive cells is approximately 0.25 inches (6.35 mm).

10. A receiver as claimed in claim 1 wherein a number of photosensitive cells within each pair of adjacent photosensitive cells is equal to a number of signal amplifiers within each distinct subset of signal amplifiers.

11. A receiver as claimed in claim 10 wherein said number of photosensitive cells within each pair of adjacent photosensitive cells comprises eight photosensitive cells and said number of signal amplifiers within each distinct subset of signal amplifiers comprises eight signal amplifiers.

12. A receiver as claimed in claim 1 wherein said plurality of signal amplifiers are coupled to a single A/D converter.

13. A receiver as claimed in claim 1 wherein said laser beam position calculator is operative to calculate a laser beam position based upon signal levels read at each of said plurality of signal amplifiers.

14. A receiver as claimed in claim 13 wherein each of said plurality of signal amplifiers is coupled to at least one cell output line and wherein said laser beam position calculator is further operative to:
  identify cell output lines having a non-zero signal level;
  identify corresponding photosensitive cells coupled to said cell output lines; and
  identify a group of consecutively numbered photosensitive cells from said corresponding photosensitive cells.

15. A receiver as claimed in claim 14 wherein said laser beam position calculator is further operative to:
  calculate said laser beam position from $$Y = \Sigma(S_i)(i)(x)/\Sigma(S_i)$$

where Y is the laser beam position $S_i$ is the signal level at each of said consecutively numbered cells, i is a cell array row number corresponding to each of said consecutively numbered cells, and x is the center-to-center spacing of adjacent consecutively numbered photosensitive cells.

16. A receiver as claimed in claim 1 wherein said laser beam position calculator is operative to:
  read signal levels at each of said plurality of signal amplifiers and rank said signal levels read at each of said plurality of signal amplifiers according to signal level magnitude so as to generate a corresponding ranking of output lines comprising a first-ranked output line and lower-ranked output lines;
  identify a subset of potential base point photosensitive cells, said subset of potential base point cells consisting of all photosensitive cells coupled to said first-ranked output line;
  identify a confirmed base point photosensitive cell from said subset of potential base point photosensitive cells by selecting the potential base point cell having peripheral photosensitive cells coupled to the lower-ranked output lines; and
  calculate a laser beam position as a function of a confirmed base point cell signal magnitude, peripheral cell signal magnitudes, a confirmed base point cell center position, and peripheral cell center positions.

17. A receiver as claimed in claim 16 wherein said laser beam position calculator is operative to calculate said laser beam position according to the following equation:

$$Y = PYSum/PSum$$

where Y is the centroid of a laser beam, PYSum is the summation of the confirmed base point and peripheral cell signal magnitudes multiplied by corresponding cell center positions, and PSum is the summation of the confirmed base point and peripheral cell signal magnitudes.

18. A receiver as claimed in claim 1 wherein said signal levels form a laser beam position code, said signal levels read at each of said plurality of amplifiers form discrete units of said position code, and said laser beam position calculator is operative to calculate a laser beam position based upon said laser beam position code.

19. A method of calculating a position of a laser beam incident upon an array of photosensitive cells comprising a single row of photosensitive cells individually spaced in succession in a single line and including a plurality of pairs of adjacent photosensitive cells and a plurality of subsets of non-adjacent mutually-coupled photosensitive cells, said method comprising the steps of:
  coupling said photosensitive cells individually spaced in succession along a single linear path to a plurality of signal amplifiers, wherein each pair of adjacent photosensitive cells is coupled to a distinct subset of amplifiers among said plurality of signal amplifiers and wherein each non-adjacent mutually-coupled cell subset is connected to a single one of said plurality of signal amplifiers; and
  calculating the position of said laser beam based upon amplified signals read at said plurality of signal amplifiers.

20. A method as claimed in claim 19 wherein said step of calculating the position of said laser beam comprises:
  identifying cell output lines having a non-zero amplified signal level and corresponding photosensitive cells connected thereto, wherein each of said plurality of signal amplifiers is coupled to at least one cell output line; and
  identifying a group of consecutively numbered photosensitive cells from said corresponding photosensitive cells.

21. A method as claimed in claim 20 wherein said step of calculating the position of said laser beam further comprises:
  calculating said laser beam position from $$Y = \Sigma(S_i)(i)(x)/\Sigma(S_i)$$

where Y is the laser beam position $S_i$ is the signal level at each of said consecutively numbered cells, i is a cell array row number corresponding to each of said consecutively numbered cells, and x is the center-to-center spacing of adjacent consecutively numbered photosensitive cells.

22. A method as claimed in claim 19 wherein said step of calculating the position of said laser beam comprises:
  ranking said signal levels read at each of said plurality of signal amplifiers according to signal level magnitude so as to generate a corresponding ranking of output lines comprising a first-ranked output line and lower-ranked output lines;
  identifying a subset of potential base point photosensitive cells, said subset of potential base point cells consisting of the photosensitive cells coupled to said first-ranked output line;
  identifying a confirmed base point photosensitive cell from said subset of potential base point photosensitive cells by selecting the potential base point cell having peripheral photosensitive cells coupled to the lower-ranked output lines; and
  calculating a laser beam position as a function of a confirmed base point cell signal magnitude, peripheral cell signal magnitudes, a confirmed base point cell center position, and peripheral cell center positions.

23. A method as claimed in claim 22 wherein said step of calculating the position of said laser beam comprises calculating said laser beam position according to the following equation:

$$Y = PYSum/PSum$$

where Y is the centroid of a laser beam, PYSum is the summation of the confirmed base point and peripheral cell signal magnitudes multiplied by corresponding cell center positions, and PSum is the summation of the confirmed base point and peripheral cell signal magnitudes.

24. A method as claimed in claim 19 wherein said step of calculating the position of said laser beam comprises establishing and decoding a laser beam position code based upon said amplified signals, wherein said signal levels read at each of said plurality of amplifiers form discrete units of said position code.

25. A laser beam receiver comprising:
  a plurality of photosensitive cells arranged in a first cell array, wherein said first cell array includes a plurality of pairs of adjacent photosensitive cells, and wherein said photosensitive cells within said first cell array comprise a single row of photosensitive cells individually spaced in succession in a single line;
  a plurality of signal amplifiers;
  a connection network operative to couple said plurality of photosensitive cells to said plurality of signal amplifiers, wherein said connection network is arranged such that
    each pair of adjacent photosensitive cells is coupled to a distinct subset of signal amplifiers among said plurality of signal amplifiers and
    at least two of said plurality of photosensitive cells are connected to a single one of said plurality of signal amplifiers; and
  a laser beam position calculator coupled to said plurality of signal amplifiers and operative to calculate a position of a laser beam incident upon said first cell array.

26. A receiver as claimed in claim 25 wherein at least three of said plurality of photosensitive cells are connected to a single one of said plurality of signal amplifiers.

27. A laser beam receiver comprising:
  a plurality of signal amplifiers;
  a plurality of photosensitive cells arranged in a first cell array, wherein said first cell array is defined by a plurality of photosensitive cell sub-arrays, and wherein each of said cell sub-arrays includes a plurality of pairs of adjacent photosensitive cells;
  a connection network operative to couple said plurality of photosensitive cells to said plurality of signal amplifiers, wherein said connection network is arranged such that
    each photosensitive cell within each cell sub-array is coupled to a distinct signal amplifier of said plurality of signal amplifiers,
    each cell sub array is coupled to a common set of signal amplifiers, and
    each of said plurality of adjacent cell subsets within said first cell array is coupled to a distinct subset of signal amplifiers; and
  a laser beam position calculator coupled to said plurality of signal amplifiers and operative to calculate a position of a laser beam incident upon said first cell array.

* * * * *